Jan. 20. 1925.
J. W. HERKEL ET AL
1,523,644
SEASONING MIXER FOR LEATHER FINISHING MACHINES
Filed July 1, 1924
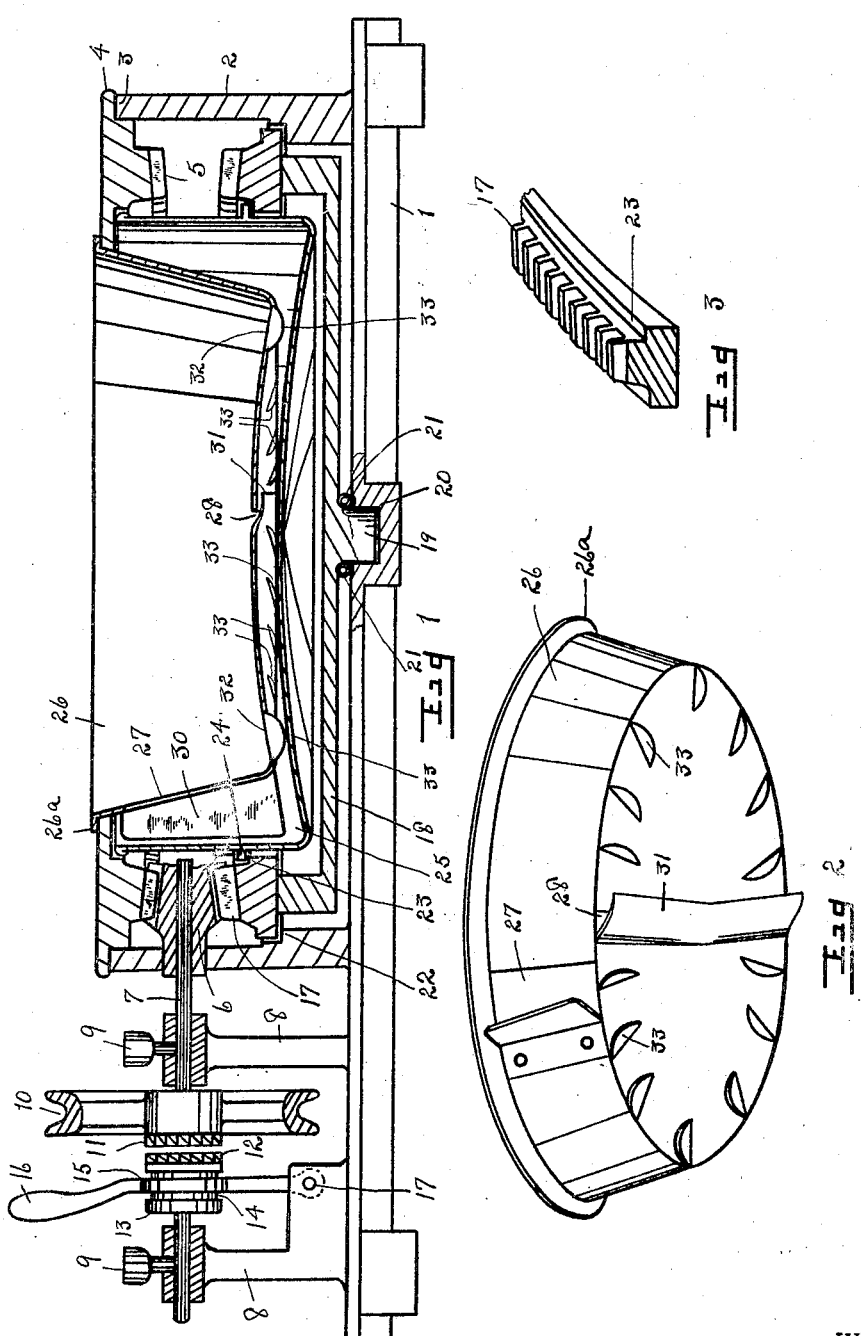
INVENTORS
John W. Herkel
James D. McCoy
BY
Thomas L. Wilder
ATTORNEY Patented Jan. 20, 1925.

1,523,644

UNITED STATES PATENT OFFICE.

JOHN W. HERKEL, OF MIDDLEVILLE, AND JAMES D. McCOY, OF LITTLE FALLS, NEW YORK.

SEASONING MIXER FOR LEATHER-FINISHING MACHINES.

Application filed July 1, 1924. Serial No. 723,571.

*To all whom it may concern:*

Be it known that we, JOHN W. HERKEL and JAMES D. McCOY, citizens of the United States, residing at Middleville and Little Falls, respectively, in the county of Herkimer and State of New York, have invented certain new and useful Improvements in Seasoning Mixers for Leather-Finishing Machines, of which the following is a specification, reference being had therein to the accompanying drawing.

Our invention relates to a seasoning mixer for leather finishing machine, and we declare the following to be a full, clear, concise and exact description thereof sufficient to enable anyone skilled in the art to which it appertains to make and use the same reference being had to the accompanying drawings in which like reference characters refer to like parts throughout the specification.

The object of the invention is to provide a device for mixing an acid solution adapted to be applied for finishing leather for commercial use. Although the machine is used more particularly in mixing such a solution, it will be found useful in mixing paints and other solvents.

The object will be understood by referring to the drawings in which:

Fig. 1 is a central vertical section of the machine, parts being shown in full;

Fig. 2 is a detail perspective view, on a smaller scale of a pan used;

Fig. 3 is a detail fragmentary perspective view of a gear rack employed.

Referring more particularly to the drawings, a frame is represented by 1 and supports an annular wall 2 equipped with an annular shoulder 3 upon which rests the outer peripheral edge 4 of the base of depending annular gear rack 5 adapted to mesh with spur gear 6 mounted to turn with shaft 7 having bearings in upstanding standards 8, 8. Grease cups 9, 9 are mounted upon standards 8, 8. A grooved pulley 10 is mounted to rotate freely upon shaft 7. Pulley 10 is connected by a belt, not shown, with any suitable source of power supply. Clutch teeth 11 are formed on the hub of pulley 10 and are adapted to mesh with the complementary teeth 12 formed on the slidingly mounted clutch member 13 adapted to rotate with shaft 7. Collar 13 has a reduced annular part 14 which is engaged by the collar or strap 15 formed integral with handle 16 that is fulcrumed at 17 in the base part of the standard 8. The movements of handle 16 will actuate clutch member 13 into and out of mesh with clutch teeth 11, whereby to rotate gear 6.

Gear 6 meshes also with the annular gear rack 17 which rests upon the ends of a rotary frame 18 mounted upon a depending shaft 19. Shaft 19 projects down into a socket 20 attached to frame 1. The upper edge of socket 20 is grooved for the reception of balls 21 upon which rests rotary frame 18, whereby to aid in reducing friction.

Furthermore, gear rack 17 is disposed just above shoulder 22 of annular wall 2, whereby said shoulder 22 will aid in steadying said rack 17, should it be necessary.

The inner shoulder 23 of annular gear rack 17 supports annular flange 24 formed integral with pan 25. The upper annular gear rack 5 supports the annular flanged peripheral edge 26ª of the inner pan 26, which is adapted to rotate with rack 5 in a direction opposite to that of rack 17 and outer pan 25. A paddle or blade 30 is riveted or otherwise fastened to the outer surface of inner pan 26 and is disposed in a radial manner thereto, whereby it will aid in stirring the liquid contained in outer pan 25, as it moves thereabout carried by rotary pan 26. Blade 30 will aid also in forcing the liquid solution into inner pan 26 through opening 27 made in the wall of said pan 26 and adjacent the location of blade 30.

The bottom surface of pans 25 and 26 are convexed upward. Furthermore, pan 25 is split diametrically, whereby to provide a narrow opening 28 for the admission of the liquid solution from pan 25. One edge along said opening 28 is bent downward, as at 31 to form a scoop adapted to aid in directing the solution from outer pan 25 into inner pan 26. Moreover, apertures 32 are formed about the periphery of the bottom surface of inner pan 26. The free edges along the cut parts of apertures 32 are bent downward at 33 to form scoops to aid in directing or scooping the solution up from outer pan 25 into inner pan 26.

In operation, when pulley 10 is rotated to revolve shaft 7 and hence gear 6, rack 17 will revolve in one direction carrying pan 25 therewith and rack 5 will revolve in the opposite direction carrying pan 26 therewith. As pan 26 rotates, blade 30 will stir up the liquid in pan 25, which liquid is being carried in the opposite direction and adjacent the periphery of outer pan 25 by centrifugal force caused by the rotation of pan 25. Blade 30 thus rotating will tend to break up the centrifugal movement of the liquid and force it into inner pan 26 through opening 27. Furthermore, the liquid solution will be forced simultaneously up through central opening 28 and peripheral openings 32 of inner pan 26 to the interior of said inner pan 26 in a thoroughly mixed condition.

Pans 25 and 26 can be removed readily at any time for the purpose of cleaning the same by lifting them off gear racks 5 and 17 respectively.

Having thus described our invention, what we claim as new and desire to secure by Letters Patent is:

1. In a seasoning mixer for leather finishing machines, pans adapted to rotate in opposite directions, and a blade attached to one of said pans, whereby to agitate the liquid contained in the other.

2. In a seasoning mixer for leather finishing machines, pans resting upon gear racks, a gear meshing with said racks, whereby to rotate said pans in opposite directions to agitate a liquid contained therein, and flanged openings in one of said pans to aid in directing the liquid therein.

3. In a seasoning mixer for leather finishing machines, pans adapted to rotate in opposite directions and means attached to one of said pans whereby to agitate the liquid contained in the other.

4. In a seasoning mixer for leather finishing machines, rotary pans, gear racks supporting said pans, a single gear for turning said pans in opposite directions and means for agitating the liquid in said pans.

5. In a seasoning mixer for leather finishing machines, rotary pans adapted to turn in opposite directions, means attached to one of said pans, whereby to agitate the liquid contained in the other and apertures formed in one of said pans, whereby said liquid may flow from one pan to the other.

6. In a seasoning mixer for leather finishing machines, removable rotary pans, gear racks supporting said pans and a single gear for turning said racks and pans in opposite directions to agitate the liquid in said pans.

In testimony whereof we have affixed our signatures.

JOHN W. HERKEL.
JAMES D. McCOY.